United States Patent [19]

Landsman

[11] 3,999,918

[45] Dec. 28, 1976

[54] APPARATUS FOR MAKING A PRINTING PLATE FROM A POROUS SUBSTRATE

[75] Inventor: Robert M. Landsman, Annandale, Va.

[73] Assignee: Log Etronics Inc., Springfield, Va.

[22] Filed: May 28, 1975

[21] Appl. No.: 581,455

Related U.S. Application Data

[62] Division of Ser. No. 485,178, July 2, 1974.

[52] U.S. Cl. .............................. 425/174.4; 101/471; 264/25; 264/321; 346/76 L

[51] Int. Cl.[2] .............................. B29C 23/00

[58] Field of Search .............. 425/174.4, 388, 385; 264/25, 321, 322; 346/1, 76 L; 101/471, 401.1

[56] References Cited

UNITED STATES PATENTS

| | | | |
|---|---|---|---|
| 2,825,282 | 3/1958 | Gergen et al. | 264/25 X |
| 3,739,088 | 6/1973 | Landsman | 346/76 L X |
| 3,742,853 | 7/1973 | Landsman | 346/76 L X |
| 3,836,624 | 9/1974 | Ferris | 264/321 |

*Primary Examiner*—Francis S. Husar
*Assistant Examiner*—Mark Rosenbaum
*Attorney, Agent, or Firm*—William D. Hall

[57] ABSTRACT

A thermoplastic plate, for example one of polypropylene or nylon, fabricated so it has an open-cell structure, has a radiation transparent cover sheet applied to one face thereof. The cover sheet has an energy absorbing coating (e.g. of carbon and nitrocellulose) in intimate contact with the plate. A modulated laser beam is then transmitted through said cover sheet to selectively transfer some of the energy absorbing material to the plate according to the configuration required to define the areas of relief desired in the plate. The cover sheet is then removed except for the portion of the energy absorbing coating transferred to the plate. The plate is heated (either before or after the foregoing steps) to a temperature just below the temperature at which the thermoplastic radically changes viscosity. The entire surface of the plate is then exposed to infra-red rays. The portions of said surface to which energy absorbing material was transferred are very quickly elevated in temperature, by the absorbed infra-red energy, to the point that the structure beneath the transferred material collapses, thus causing those portions to sink to a plane below the plane of the other portions of the plate.

8 Claims, 11 Drawing Figures

Step 1.

Step 2.

PRIOR ART

Step 3.

Step 4 (First Form)

Step 4 (First Alternate Form)

Step 4 (Second Alternate Form)

Step 5 (Optional)

Step 6 (First Form)

Step 6 (Second Form)

APPARATUS FOR MAKING A PRINTING PLATE FROM A POROUS SUBSTRATE

RELATED APPLICATION

This application is a division of my prior copending application, Ser. No. 485,178, filed July 2, 1974, entitled "Method and Apparatus for Making a Printing Plate from a Porous Substrate".

BACKGROUND OF THE INVENTION

It has previously been proposed to produce a printing plate by selectively collapsing the open cell structure of a thermoplastic plate to provide relief (depression of non-printing areas), and thereby to define the non-depressed portions necessary for performing a printing operation.

It is an object of this invention to carry out the foregoing basic method in a more effective manner and at a lower cost.

It is a further object of the invention to achieve a more complete collapse of the cell structure in the areas where relief is desired, and to better define the planar difference between the raised and relief portions of the plate.

SUMMARY OF THE INVENTION

I will first summarize my basic invention, described and claimed in my aforesaid parent application Ser. No. 485,178, and then I will explain the inventive concept which is the subject matter of the present divisional application.

A low-energy absorbing thermoplastic printing plate, having an open-cell structure, has energy absorbing material selectively applied to those areas of its surface where relief (depression of non-printing areas) is desired. The plate is then exposed to infra-red energy to collapse the cells in said areas and provide relief in the plate.

Alternatively, the plate may have high energy absorbing characteristics if the portions thereof to which said material is applied are thereby given low energy absorbing characteristics.

Having thus described my basic invention, I will now describe several inventive improvements which may be applied to the basic concept:

The thermoplastic printing plate, at the start of the process, may be polypropylene, nylon, or other similar material.

Within the scope of the basic invention described above, the said "material" may be selectively applied to the plate in any suitable way. Two such ways, each of which is an improvement upon the basic concept, will now be described. First, a cover sheet applied to the plate may have "material" in the form of a coating which, when exposed to radiant energy directed through the cover sheet, is transferred to the plate. Secondly, the cover sheet may include the "material" and will transfer it to the plate when the cover sheet is impressed with a mechanical force (such as when one draws on a sheet of carbon paper or causes the type bar of a typewriter to strike the ribbon to effect a transfer of an image). Preferably, the transfer of the "material" to the plate should be an "impact" type of transfer. A typical and suitable impact transfer method will now be described.

According to a further improvement, the radiation transparent cover sheet on the plate is polyethylene terephthalate (sold under the trade name Mylar) and this cover sheet has a coating of an energy absorbing material such as carbon and nitrocellulose, in contact with one surface of the plate. The coating is maintained in intimate contact with the plate in any suitable way, such as by applying a vacuum to the opposite surface of the porous open celled plate. A beam, of suitable radiation and power, such as from a laser, then traverses those areas of the plate where relief is desired and transfers a portion of the coating to the surface of the plate.

The Mylar layer is then removed, leaving a pattern of coating material that has been transferred to the surface of the plate. The plate can then be given an infra-red exposure, to selectively collapse and seal the areas where relief is desired, thereby providing shallow relief in the order of 0.0003 to 0.01 inch.

Another improvement upon the invention includes a second treatment of the plate with infra-red energy to achieve a more complete collapse of the cells in the areas of relief. If a cooling fluid, such as air, is passed through the plate during this second treatment, it will selectively cool the printing areas, assisting in the prevention of cell collapse of those areas. Since the cells have at least partially collapsed and become sealed in the areas where relief is desired, the cooling fluid will not keep these cells cool, and they will be heated to a degree necessary to achieve the desired relief.

The inventive concept which is the subject matter of this divisional application is as follows:

Either or both of the aforesaid treatments of the plate with infra-red energy is preferably carried out after the plate has been raised to a temperature just below that at which the plate material undergoes a radical change of viscosity. Following such a pre-heating of the plate, the infra-red energy falling on the deposited energy-absorbing coating on the surface of the plate adds energy to those areas of said surface on which some of the coating has been deposited. This energy causes the structure under said areas to collapse, thus resulting in a relief of the surface in those areas. This enables the infra-red heating step(s) to be carried out very rapidly.

An improvement results by filtering out, from the infrared rays applied to the plate, those wavelengths to which the plate (without treatment with energy absorbing material) has maximum absorption. This still further enhances the thermal contrast between the areas of the plate with the energy absorbing coating and the areas without the coating.

DETAILED DESCRIPTION OF THE INVENTION

Figure 1:
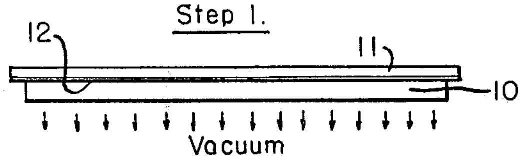
FIG. 1 is a side view of Step I of the process.

The plate 10, after the processing hereinafter described, becomes the printing plate. At the start, this is a plate fabricated of polypropylene, nylon, or other thermoplastic material. Preferably the plate 10 should exhibit a sharp transition between its solid and its semi-solid states as its temperature rises. This characteristic is exhibited by polypropylene between 150° and 180° C. If the material has the desired sharp transition, and is preheated to a temperature just below that at which the plate becomes semi-solid, a further surface temperature rise of several degrees Centigrade, resulting from exposure to infrared rays, will cause structural collapse in the plate and cause the portions of the plate exposed to the infrared energy to sink below the surface of the plate by 0.0003 inch or more. In other words, the plate material should have a high "melt index". The melt index is sufficiently "high" for the purpose of this invention if it is greater than 3.

It is also preferable that plate 10 have an interconnected open-cell structure, to permit transpiration cooling. This can be easily achieved by preparing the plate in accordance with the instructions specified in lines 57 et seq., of column 3, of my U.S. Pat. No. 3,779,779, entitled "Radiation Etchable Plate", issued Dec. 18, 1973.

In the first step of the method, a radiation transparent cover sheet 11 of polyethylene terephthalate (sold under the trade name Mylar), having an energy absorbing coating 12, such as a mixture of carbon and nitrocellulose, on its underside, is placed in intimate contact with the upper side of plate 10. Thus the carbon and nitrocellulose coating is in direct contact with the upper surface of plate 10.

The aforesaid intimate contact may be maintained in any suitable way, such as by applying a vacuum to the underside of open-celled plate 10, or by applying electrostatic charge(s) to one or both of plate 10 and/or cover sheet 11.

Figure 2:
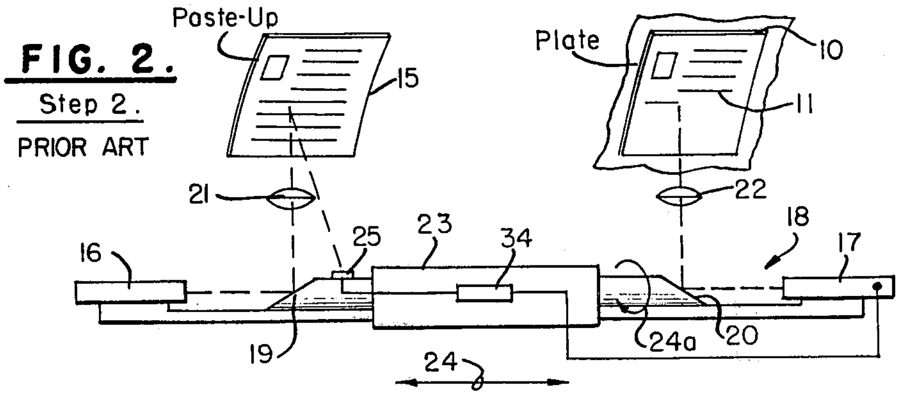
FIG. 2 is a perspective view of Step II of the process.

In Step II, the plate 10, with its cover sheet 11, is next exposed to a very fine laser beam of infrared energy, which is scanned across the plate and modulated as necessary to transfer the information to be printed to plate 10. This is done in accordance with FIG. 2 of my prior U.S. Pat. No. 3,739,088, granted June 12, 1973, and entitled "Printing Plate Production Method and Apparatus". FIG. 2 of that patent is reproduced here (as FIG. 2) except that in the present drawing the cover sheet 11, bearing energy absorbing coating 12 thereon, is superimposed on plate 10.

In the apparatus illustrated in FIG. 2, the paste-up 15 and plate 10 are supported in curved condition concentrically relative to the axis of an elongated rotating double scanning assembly 18. The lasers 16 and 17 are carried at opposite ends of assembly 18 for their beams to be deflected by rotating angular mirrors 19 and 20 through focusing lenses 21 and 22 to impinge respectively on the paste-up 15 and the plate 10.

As indicated by the arrows 24a and 24, the mirror and lens is rotated by a drive mechanism 23 and is simultaneously moved axially by suitable translational drive means such as a linear induction motor or pneumatic cylinder so that the beams from lasers 16 and 17 scan along a spiral path. The entire scanning assembly is suitably mounted on an air bearing member.

The beam from the laser 16 as focussed on the paste-up 15 by the lens 21 is reflected back to a detector 25 which converts the reflected light of the beam into electric signals whose intensities are proportional to the intensity of the reflected light received. The detector 25 is suitably a photomultiplier, or photodiode, and is connected to actuate a modulator 34. The modulator 34 is connected to modulate the intensity of the beam from the laser 17 in a binary manner corresponding to the signals received from the detector 25 for reproducing a template on the plate 10 corresponding to the material represented on the paste-up 15 as described above.

The laser 16 is suitably a neon helium laser which has an operating wavelength of 0.6328 microns, and the lens 21 is selected to focus the beam from laser 16 into a spot of about 0.001 inch diameter on the paste-up 15.

When the beam from laser 17 passes through lens 22 and impinges on transparent cover sheet 11, a portion of the energy absorbing carbon and nitrocellulose coating 12 is transferred to the plate 10, where it forms a pattern, normally as a negative of the material to be printed, as will appear.

My prior U.S. Pat. No. 3,816,659, for "Scanning Apparatus", issued June 11, 1974, contains suggestions that may be helpful in constructing the apparatus shown in FIG. 2 of the present application.

The polypropylene plate 10 is formulated to exhibit minimum infrared absorption. However, where the laser beam has transferred carbon and nitrocellulose to the plate, the absorption of infrared energy will be much greater. Thus, in response to the infrared heating steps described below, the energy absorbing portions of the plate will be heated more than the untreated portions of the plate.

The vacuum previously described in connection with Step I may be continued during Steps II and III.

Figure 3:
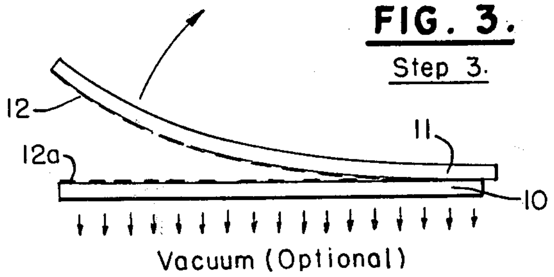
FIG. 3 is a side view of Step III of the process.

Step III consists merely of peeling cover sheet 11 from plate 10, as shown in FIG. 3. This leaves that portion 12*a* of coating 12 which was transferred to plate 10 intact on that plate.

Instead of employing a polypropylene plate 10 with minimum infrared absorption, and a coating of carbon and nitrocellulose to increase the absorption, the reverse may be done. That is, one may fabricate a polypropylene plate 10 with maximum absorption and a coating 12 that will reduce the absorption of the plate 10 in the areas to which the coating is transferred. In event such a reversal is employed, the writing step should also be reversed so that transfer of the coating occurs in the areas which will receive ink and print the desired text, instead of in the areas of relief (non-printing areas).

Furthermore, instead of using a carbon and nitrocellulose coating 12 and a laser beam, various other energy absorbing coatings and methods of transferring the same may be employed. Transfer to the plate 10 may be accomplished in any suitable way, including any suitable mechanical method. For example, the pressure transfer of a carbon coating from carbon paper, or of heat-absorbing ink from a typewriter ribbon, may be used. Furthermore, suitable thin metallic foils may be used as energy reflecting material, and methods of transferring such metallic foils to other objects may be used to transfer such thin metallic foils to plate 10. Other suitable coatings and transfer techniques are described in U.S. Pat. No. 3,745,586, issued July 10, 1973, to Robert S. Braudy for "Laser Writing", U.S. Pat. No. 3,787,210, issued Jan. 22, 1974, to Donald Lee Roberts for "Laser Recording Technique Using Combustible Blow-Off", and Woodward, IBM Technical Disclosure Bulletin Vol. 9, No. 11, April, 1967, page 1592. Preferably the transfer of the coating to the plate should be by an impact method, several of which methods have been referred to above.

Step IV comprises directing infrared or other suitable radiant energy onto the imaged surface of plate 10. The time of application, and the intensity of this energy, are carefully selected so that the areas of the surface of plate 10 to which carbon and nitrocellulose 12*a* have been selectively transferred change viscosity. Consequently, the open-cell structure under such areas collapses, causing the surface in such areas to sink below the surface of the printing areas, which remain solid since the temperature to which they are heated is lower. To facilitate this, the plate may be pre-heated in an oven or by transpiration methods to a temperature just below the thermoplastic transition temperature, so that the infrared heating step may then be of short duration. This limits the conduction process in the plate, and is therefore a desirable result since heat conduction in the plate, when part of the plate has reached a semi-solid state, reduces the resolution of the resulting printing plate.

Figure 4:
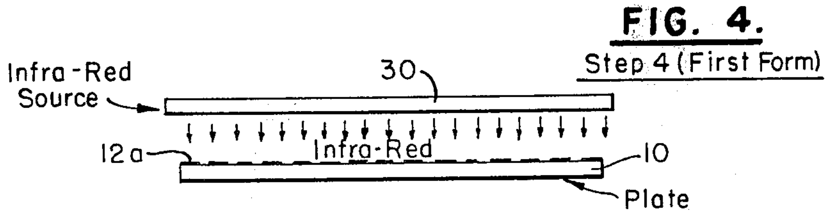
FIG. 4 is a side view of one optional form of Step IV of the process.

I will next describe three ways that the infrared heating step, just referred to, may be carried out:

1. As shown in FIG. 4, the upper side of plate 10 may be exposed to an infrared source 30 which heats the entire upper surface of plate 10 simultaneously.

Figure 4A:
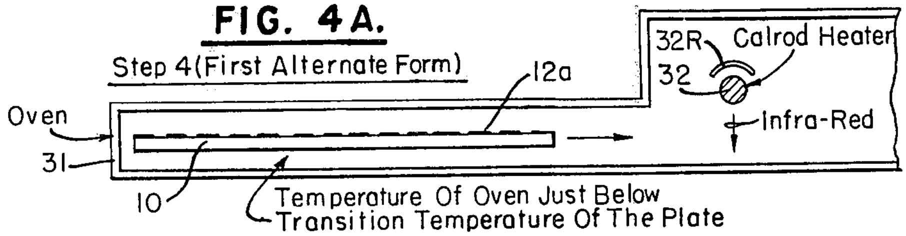
FIG. 4A is a first alternate form for carrying out Step IV of the process.

2. As shown in FIG. 4A, the plate 10 may be held in oven 31 until it achieves a temperature just below the transition temperature. It is then moved to the right under the elongated Calrod heater (or other elongated source of infrared radiation). The heater 32 may have a suitable reflector 32R to concentrate its heating power along a very limited but straight segment of plate 10. As a given segment of plate 10 passes under heater rod 32, that portion of the segment having the carbon and nitrocellulose coating transferred thereto is heated more, by the absorption of energy. This collapses the structure of the plate under the coated areas of that segment.

If plate 10 has the necessary sharp transition from a solid to a semi-solid state, and the other desired characteristics explained above, and if the heater 32 emits suitable energy toward the plate 10, a cell collapse, sufficient to cause the surface of plate 10 to sink about 0.0003 to 0.01 inch in the areas to which carbon has been transferred, will occur as a result of an exposure to the infrared rays for about one second. The preferred speed of plate 10 past the infrared heater 32 will give the plate an exposure for about one second.

Figure 4B:
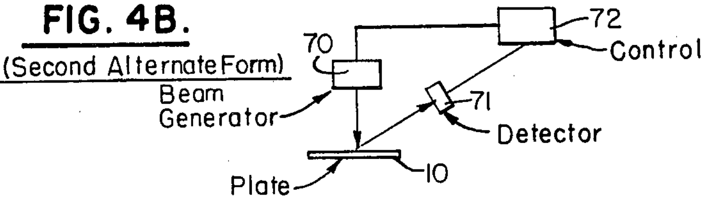
FIG. 4B is a second alternate form for carrying out Step IV of the process.

3. As shown in FIG. 4B, the preferred way of heating the plate is by a controlled beam of infrared energy, such as the beam of a tungsten halogen lamp (such as G E Quartzline, Type DYS, rated at 600 watts and 120 volts), that scans the surface of plate 10. Energy reflected by the surface of plate 10 operates detector 71 to provide the input to control apparatus 72, which controls radiant source 70 to increase the beam intensity incident upon those areas where the plate surface has a large heat absorptivity due to the transferred coating 12 and to decrease the intensity where the plate surface is uncoated and has a low heat absorptivity. Apparatus for determining the surface reflectivity and for controlling the beam is shown in Craig U.S. Pat. No. 2,842,025, issued July 8, 1958, entitled "Photographic Method", and in Folse U.S. Pat. No. 3,036,497, issued May 29, 1962, entitled "Photographic Dodging Apparatus".

Figure 5:
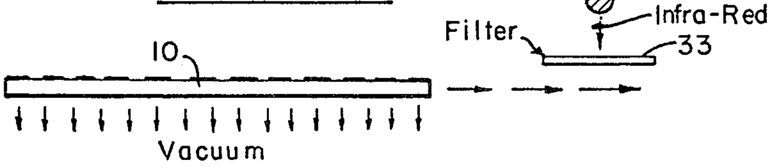
FIG. 5 is a side view of apparatus for carrying out Step V of the process. This step is optional, but its inclusion is an improvement.

Step V of the process, shown in FIG. 5, is an improvement, and will now be described. After Steps I through III have been completed, the plate 10 is passed under Calrod heater 32. The infrared energy from rod 32 passes through filter 33, which may be made of the same material as the plate 10. The filter 33 is therefore particularly absorbent to the radiant energy which has optimum heating effect on those portions of plate 10 which have had no part of the carbon and nitrocellulose coating 12 transferred thereto. This enhances the differential heating effect between the coated portions of the surface of plate 10 (the portions to which some of said coating 12 has been transferred) and the uncoated portions of said surface, resulting in a more complete collapse of the cell structure under the coated portions. This step will not, however, create any collapse of the cell structure of those areas to which no part of the coating 12 was transferred.

Figure 7:
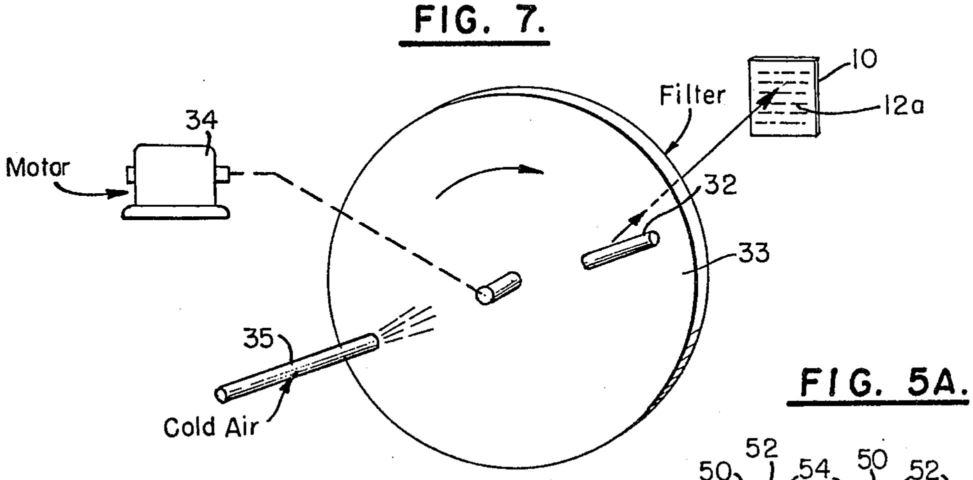
FIG. 7 illustrates modified apparatus for carrying out Steps IV and/or V.

As shown in FIG. 7, the filter plate 33 is rotated by motor 34 past the outlet of cold air 35. Hence, any heat from the radiant energy source 32 (directed through filter plate 33 at plate 10) which has been absorbed by filter plate 33 is dissipated without significantly elevating the temperature of the filter plate 33.

If a vacuum is applied to the underside of plate 10 during Step V, air will be induced to flow through the open cells in the surface of plate 10, that is, through the cells in the areas to which no part of coating 12 was transferred. Since the other surface cells have at least partially collapsed, the air flow through them will be wholly or partially impaired. The transpiration cooling therefore enhances the local temperature differences. It does not interfere with collapse of cells in the areas to which some of the coating 12 was transferred, and may, in fact, enhance the cell collapse as a result of the pressure gradient created. On the other hand, air does flow through those portions of the upper surface of plate 10 where there has been no collapse of the cell structure, thus keeping those portions cool and free from collapse.

Instead of applying a vacuum to the lower side of the plate, to generate the above-mentioned air flow, any suitable air pressure differential may be applied across the plate.

Figure 5A:
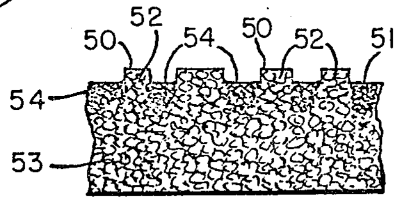
FIG. 5A is a greatly enlarged view of a portion of plate 10 of FIG. 5.

FIG. 5A is a greatly enlarged sectional view of FIG. 5. It is noted that the upper surface of the plate 10 has printing portions 50 and areas of relief 51. The cells 52 in the printing portions 50 have not collapsed and are interconnected with the open cells 53 in the body of the plate. The cells 54, just beneath each area of relief, have, however, collapsed and are at least partly sealed against transmission of air therethrough.

Figure 6A:
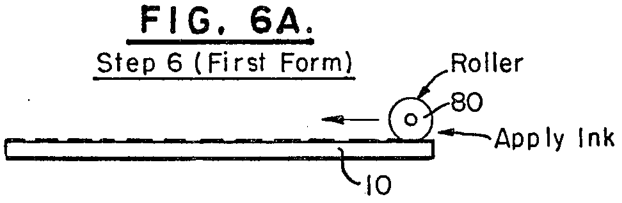
FIG. 6A illustrates Step VI and shows how the resulting plate may be inked for letterpress or letterset printing.

If the process is carried out as aforesaid, a printing plate suitable for letterpress or letterset work is produced and may be inked by a roller 80, as shown in Step VI, FIG. 6A.

Figure 6B:
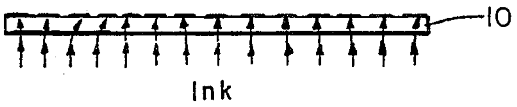
FIG. 6B illustrates a modified form of Step VI and shows how the plate may be inked for screen printing.

For screen printing (FIG. 6B), the ink may be forced through the plate from the side which does not contact the paper to the printing side. The ink will travel through the non-collapsed portion of the cell structure to the raised printing portions on the plate and will thus wet those portions with ink. Ink will not, however, pass through those relieved portions of the plate where the structure has been sealed.

If the starting plate 10 of FIG. 1 is composed of urethane rubber (e.g., Estane 58105, a product of B. F. Goodrich Co.) the end product (after Steps I to V) will be suitable for flexographic printing and may be linked as shown in FIG. 6A.

I claim to have invented:

1. Apparatus for making a printing plate from an open-cell type of thermoplastic plate, said thermoplastic being of a type that exhibits a radical decrease in viscosity at a given temperature, comprising coating material, means operatively associated with said plate for selectively applying said coating material to one side of said thermoplastic plate to form thereby a replica of the printing configuration desired, so that the coating material provides a first surface on said side of said thermoplastic plate with the uncoated portion of said side of said thermoplastic plate comprising a second surface, said coating material having a substantially different thermal absorptivity than the uncoated portion of said side of the thermoplastic plate, whereby one of said surfaces has substantially greater thermal absorptivity than the other of said surfaces, pre-heating means operatively associated with said plate for heating said thermoplastic plate to a temperature just below the temperature at which the thermoplastic radically decreases its viscosity, whereby to provide a pre-heated plate, means operatively associated with said plate for exposing the pre-heated plate to infrared radiation of a wavelength which is absorbed to a relatively large degree by said one of said surfaces and to a relatively small degree by the other of said surfaces to thereby collapse the structure under said one surface without collapsing the structure under said other surface, said last-named means including a filter, said filter being composed of a material which duplicates the infrared absorption characteristics of said other surface of said printing plate, and means operatively associated with said filter for repeatedly passing a portion of the filter into the path of infrared energy to said plate, and means operatively associated with said filter for cooling said portion of the filter immediately prior to its exposure to said infrared radiation.

2. Apparatus as defined by claim 1 in which said coating material has substantially greater infrared absorptivity than the uncoated surface of said side of said thermoplastic plate.

3. Apparatus as defined in claim 2 having means adjacent said filter for cooling said filter.

4. Apparatus for making a printing plate from an open-cell type of thermoplastic plate comprising coating material, means operatively associated with said plate for selectively applying said coating material to a side of said thermoplastic plate to thereby form two surfaces one of which is a replica of the printing configuration desired on the plate, the two surfaces including a surface of said side of the plate covered by said coating material and a surface of said side of the plate not covered by said coating material, said surfaces having different thermal absorptivity, means operatively associated with said plate for exposing said side of said plate to infrared radiation to collapse the structure under said surface of greater absorptivity without collapsing the structure under the surface of lesser absorptivity, said last-named means including a filter that has maximum absorptivity to passage therethrough of energy of a wavelength corresponding to the wavelength at which said surface of lesser absorptivity has maximum absorption, said filter being in the path of infrared energy to said side of said plate.

5. Apparatus as defined by claim 4 in which said coating material has substantially greater infrared absorptivity than the uncoated surface of said side of said thermoplastic plate.

6. Apparatus for making a printing plate as defined in claim 4 having means adjacent said filter for cooling at least a portion of said filter.

7. Apparatus for making a printing as defined in claim 4 having means for heating said plate, after the application of said coating and prior to the application of said infrared radiation, to a temperature just below the temperature at which the thermoplastic radically changes viscosity.

8. Apparatus as defined in claim 5 having means adjacent said filter for cooling said filter.

* * * * *